US012311491B2

(12) United States Patent
Trenkle et al.

(10) Patent No.: US 12,311,491 B2
(45) Date of Patent: May 27, 2025

(54) SYSTEM COMPRISING A TRANSPORT DEVICE FOR TRANSPORTING A CARRIER FOR GOODS IN TRANSPORT, A CARRIER FOR GOODS IN TRANSPORT AND A RECEIVING APPARATUS

(71) Applicant: DECKEL MAHO Pfronten GmbH, Pfronten (DE)

(72) Inventors: Michael Trenkle, Pfronten (DE); Sebastian Riedel, Eisenberg (DE)

(73) Assignee: DECKEL MAHO Pfronten GmbH, Pfronten (DE)

( * ) Notice: Subject to any disclaimer, the term of this patent is extended or adjusted under 35 U.S.C. 154(b) by 713 days.

(21) Appl. No.: 17/604,715

(22) PCT Filed: Dec. 13, 2019

(86) PCT No.: PCT/EP2019/085067
§ 371 (c)(1),
(2) Date: Oct. 18, 2021

(87) PCT Pub. No.: WO2020/221470
PCT Pub. Date: Nov. 5, 2020

(65) Prior Publication Data
US 2022/0193845 A1    Jun. 23, 2022

(30) Foreign Application Priority Data
May 2, 2019   (DE) .................. 10 2019 111 401.2

(51) Int. Cl.
*B23Q 7/14* (2006.01)
*B66F 9/06* (2006.01)
(Continued)

(52) U.S. Cl.
CPC .......... *B23Q 7/1442* (2013.01); *B23Q 7/1494* (2013.01); *B66F 9/063* (2013.01);
(Continued)

(58) Field of Classification Search
CPC ... B23Q 7/1442; B23Q 7/1494; B23Q 7/1431
See application file for complete search history.

(56) References Cited

U.S. PATENT DOCUMENTS 4,698,775 A   10/1987  Koch et al.
4,746,258 A    5/1988  Loomer et al.
(Continued)

FOREIGN PATENT DOCUMENTS

DE    2715301 A1   10/1978
DE    3115775 A1   11/1982
(Continued)

OTHER PUBLICATIONS

English language translation of Office Action dated Aug. 11, 2021 for German App. Ser. No. 10 2019 111 401.2.
(Continued)

*Primary Examiner* — Mark C Hageman
(74) *Attorney, Agent, or Firm* — Henricks Slavin LLP

(57) ABSTRACT

The present invention relates to a system, comprising: a transport device 100 comprising a transport vehicle 110 which can be moved freely on a base area and a handling device 150 provided on the transport vehicle 110, a carrier for goods in transport 200 which can be received by the handling device 150 and includes at least one first alignment element 220, and a receiving apparatus 300 for receiving the carrier for goods in transport 200 which can be set up on the base area or arranged on a machine set up on the base area, wherein the handling device 150 is configured to hold the carrier for goods in transport 200 in such a way that, when the carrier for goods in transport 200 is inserted and/or exchanged on the receiving apparatus 300 by the handling device 150, the carrier for goods in transport 200 is kept movable relative to the handling device 150, and the receiving apparatus 300 includes at least one second alignment element 320 which, when the carrier for goods in transport
(Continued)

200 is inserted and/or exchanged, is configured to interact with the at least one first alignment element 220 of the carrier for goods in transport 200 for aligning the carrier for goods in transport 200 with the receiving apparatus 300.

16 Claims, 10 Drawing Sheets

(51) Int. Cl.
  *B66F 9/18* (2006.01)
  *B66F 9/19* (2006.01)
  *B25J 9/16* (2006.01)
(52) U.S. Cl.
  CPC ............... *B66F 9/18* (2013.01); *B66F 9/195* (2013.01); *B25J 9/162* (2013.01)

(56) References Cited

U.S. PATENT DOCUMENTS

| | | | | |
|---|---|---|---|---|
| 4,861,220 A * | 8/1989 | Smith | ............... | B60P 1/649 414/498 |
| 5,470,193 A * | 11/1995 | Miura | ............... | B23Q 7/1447 414/331.04 |
| 5,531,005 A * | 7/1996 | Morshauser | ......... | B23Q 1/0063 29/33 P |
| 5,882,172 A * | 3/1999 | Kawai | ............... | B23Q 7/02 198/478.1 |
| 7,357,629 B2 * | 4/2008 | Weiskopf | ............... | B33Y 30/00 425/188 |
| 7,385,386 B2 * | 6/2008 | Amemiya | .......... | G01R 31/2887 414/590 |
| 9,870,002 B1 | 1/2018 | Holmberg et al. | | |
| 10,647,559 B2 * | 5/2020 | Schwarz | ............... | B66F 9/18 |
| 11,235,680 B2 * | 2/2022 | Zhang | ............... | B60L 53/35 |
| 2013/0140099 A1 * | 6/2013 | Ojima | ............... | B60K 1/04 29/729 |
| 2015/0114736 A1 * | 4/2015 | Avganim | ............... | B60K 1/04 180/68.5 |

FOREIGN PATENT DOCUMENTS

| | | |
|---|---|---|
| DE | 3316050 A1 | 11/1984 |
| DE | 3818261 C1 | 11/1989 |
| EP | 0063253 A2 | 10/1982 |
| FR | 2485497 A1 | 12/1981 |
| GB | 2162450 A | 2/1986 |
| JP | 3-196937 A | 8/1991 |
| JP | 3-287354 A | 12/1991 |
| JP | 2001-138168 A | 5/2001 |
| WO | WO 2020/043916 A1 | 3/2020 |

OTHER PUBLICATIONS

English language translation of Office Action dated Mar. 9, 2023 for Japanese App. Ser. No. 2021-564742.
International Search Report dated Apr. 23, 2020 for PCT App. Ser. No. PCT/EP2019/085067.
Office Action dated Nov. 15, 2023 for Chinese App. No. 201980096008.3, with English language translation.
Office Action dated Apr. 18, 2023 for Chinese App. No. 201980096008.3, with English language translation.
Office Action dated Aug. 16, 2024 for European App. No. 19835256.9, with English language translation.

\* cited by examiner

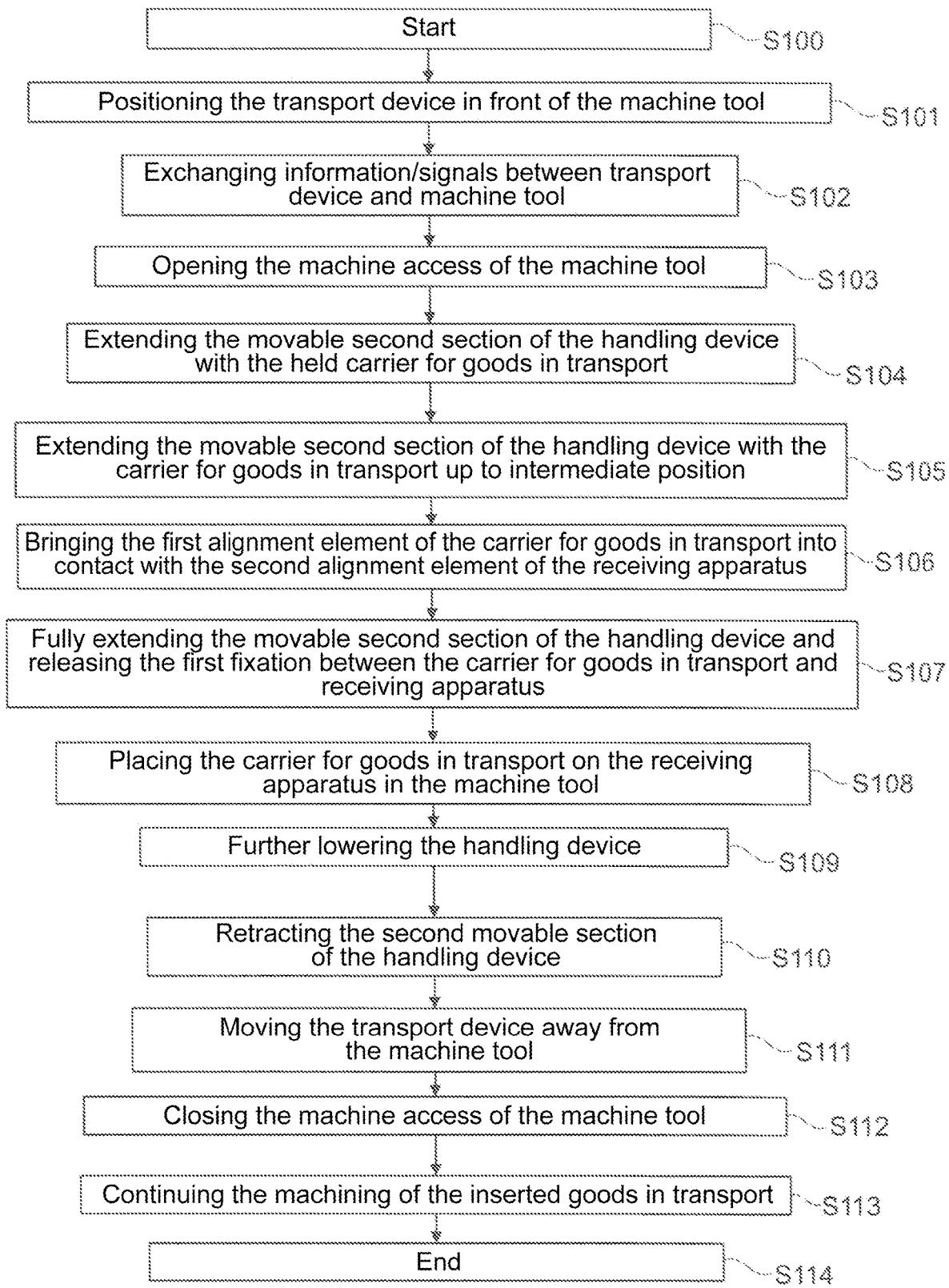

SYSTEM COMPRISING A TRANSPORT DEVICE FOR TRANSPORTING A CARRIER FOR GOODS IN TRANSPORT, A CARRIER FOR GOODS IN TRANSPORT AND A RECEIVING APPARATUS

The present invention relates to a system comprising a transport device for transporting a carrier for goods in transport, a carrier for goods in transport and a receiving apparatus. The present invention also relates to a transport device, a carrier for goods in transport and a receiving apparatus.

BACKGROUND OF THE INVENTION

In addition to the use of a wide variety of machine tools, machining centers and warehouses, transport devices are also used to bring the required components, tools and/or workpieces to their respective place of use In order to automate the production process or manufacturing.

In this context, it is particularly important for the positionally precise, automated receipt of carriers for goods in transport such as of a machine pallet/workpiece pallet (pallet) or a zero-point clamping plate that they are aligned with the receiving apparatus before they can be received by the respective receiving apparatus.

Here, freely movable transport devices regularly do not have the necessary positioning accuracy to bring about the alignment of the pallet or zero point clamping plate required for the receiving apparatus. In some cases, there may be a deviation of several centimeters between the feasible positioning by the transport device and the required positioning of the receiving apparatus.

SUMMARY OF THE INVENTION

It is therefore an object of the present invention to provide a system comprising a transport device for transporting a carrier for goods in transport, a carrier for goods in transport, and a receiving apparatus for avoiding the above-mentioned problems.

It is a further object of the present invention to provide a transport device, a carrier for goods in transport, and a receiving apparatus with which the above problems are avoided.

To achieve these objects, a system according to claim 1, a transport device according to claim 17, a carrier for goods in transport according to claim 18, and a receiving apparatus according to claim 19 are proposed. The dependent claims relate to advantageous exemplary embodiments of the system according to the invention.

The system according to the invention comprises: a transport device comprising a transport vehicle which can be moved freely on a base area and a handling device provided on the transport vehicle, a carrier for goods in transport which can be received by the handling device and includes at least one first alignment element, and a receiving apparatus for receiving the carrier for goods in transport which can be set up on the base area or arranged on a machine set up on the base area, wherein the handling device is configured to hold the carrier for goods in transport in such a way that, when the carrier for goods in transport is inserted and/or exchanged on the receiving apparatus by the handling device, the carrier for goods in transport is kept movable relative to the handling device, and the receiving apparatus includes at least one second alignment element which, when the carrier for goods in transport is inserted and/or exchanged, is configured for interaction with the at least one first alignment element of the carrier for goods in transport for aligning the carrier for goods in transport with the receiving apparatus.

By connecting a transport device to a handling device which keeps the carrier for goods in transport movable, for example in the form of a floating support, the transport device with the carrier for goods in transport can approach the receiving apparatus without having to precisely align the carrier for goods in transport with the receiving apparatus.

The alignment of the carrier for goods in transport is then carried out when the carrier for goods in transport is positioned over the receiving apparatus by making direct contact between a first alignment element of the carrier for goods in transport and a second alignment element of the receiving apparatus before the carrier for goods in transport is actually received by the receiving apparatus. The carrier for goods in transport may be positioned by the travel movement of the transport device itself or by a movement of the handling device, for example contacting or extending (telescoping) a section of the handling device.

By means of the positioning movement in conjunction with the handling device holding the carrier for goods in transport in a movable, the position of the carrier for goods in transport relative to the receiving apparatus can be corrected and an alignment can take place before the transport device or the handling device places the carrier for goods in transport on the receiving apparatus.

Clear advantages of this solution are that no compensating movement of the handling device has to be carried out and also that no additional alignment drives have to be used in order to correct the relative position of the carrier for goods in transport with respect to the receiving apparatus. This, in turn, results in the advantage that the weight of the device (here the handling device) received by the transport vehicle can be lower so that a greater payload can be received by the transport device in turn.

Furthermore, the proposed solution does not require a position measurement of the carrier for goods in transport (with respect to the receiving apparatus). In addition, the proposed solution needs hardly any maintenance, is inexpensive and easy to retrofit.

An advantageous development of the system according to the invention is that the first alignment element of the carrier for goods in transport is provided on the side of the carrier for goods in transport facing away from the transport vehicle or on the side of the carrier for goods in transport facing the transport vehicle.

As a result, depending on the nature of the carrier for goods in transport and/or the receiving apparatus, the alignment elements may be positioned such that the contact between the first and the second alignment elements and thus the alignment of the carrier for goods in transport takes place reliably. In addition to the possibilities mentioned, the alignment elements may also be provided at any other position on the carrier for goods in transport or on the receiving apparatus, for example laterally (with respect to the positioning movement of the carrier for goods in transport over the receiving apparatus).

A further advantageous development of the system according to the invention is that the at least one first alignment element of the carrier for goods in transport and correspondingly the at least one second alignment element of the receiving apparatus are configured as a combination of one or more bolts and one or more prisms, wherein the carrier for goods in transport includes the bolts or the prisms and the receiving apparatus correspondingly includes the prisms or the bolts.

The combination of bolts and a prism for aligning the carrier for goods in transport with the receiving apparatus is only one possibility. Various other shapes (for example that of a roof-edge profile or conical elements, etc.) in combination with a bolt/cylinder may also be used for this purpose. The number of bolts/prisms (or any other shapes) may also be selected freely depending on the requirements for the alignment and/or the nature (for example available installation space) of the carrier for goods in transport or the receiving apparatus.

In addition, an advantageous development of the system according to the invention is that the handling device includes a support section by which the carrier for goods in transport is held.

Here, the carrier for goods in transport may simply be placed on a support section of the handling device (similar to a transport fork) and then be transported accordingly to the desired receiving apparatus. Furthermore, the carrier for goods in transport has mobility with respect to the support section, since it only rests thereon, which allows for the carrier for goods in transport to be aligned with the receiving apparatus as soon as the carrier for goods in transport is positioned over the receiving apparatus.

An advantageous development of the system according to the invention also is that the handling device includes a bearing mechanism configured such that the carrier for goods in transport is held by the bearing mechanism and is kept movable relative to the handling device.

In order to improve the mobility of the carrier for goods in transport with respect to the handling device, it may be advantageous to provide a bearing mechanism by which the carrier for goods in transport is movably supported with respect to the handling device. This bearing mechanism may significantly reduce the adhesive or frictional forces when aligning the carrier for goods in transport and thus significantly reduce abrasion/wear of the corresponding components.

A further development of the system according to the invention in this context therefore is that the bearing mechanism includes slide bearing elements and/or rollers and/or ball rollers.

The options mentioned should not be understood as conclusive; rather, all other options for reducing friction/wear may be used, for example aerostatic bearings, etc.

An advantageous development of the system according to the invention is that the handling device has at least one fixation for the carrier for goods in transport configured such that the carrier for goods in transport is prevented from falling off the handling device during transport by the transport device.

A further advantageous development of the system according to the invention is that the fixation for the carrier for goods in transport of the handling device includes a first fixation facing away from the transport vehicle and a second fixation facing the transport vehicle.

As a result, a plurality of fixings may be used for the safe transport of the carrier for goods in transport if required. In addition, a plurality of fixations or fixation options offer the advantage that, depending on the configuration of the carrier for goods in transport, different fixations may be combined with one another if not all fixations can be used at the same time.

An advantageous development of the system according to the invention is that the first fixation and/or the second fixation of the fixation for the carrier for goods in transport are configured as a stop so that there is no relative movement of the carrier for goods in transport with respect to the handling device during the transport of the carrier for goods in transport.

This may advantageously prevent the carrier for goods in transport from slipping on the handling device or, in the worst case, even falling off the handling device.

Furthermore, the system according to the invention may be developed in that the second fixation includes a rear grip, so that the carrier for goods in transport is prevented from being tipped over and off the handling device during the transport of the carrier for goods in transport.

In addition to slipping and falling of the carrier for goods in transport, unevenly distributed loads may also pose a problem during transport. They may result in the carrier for goods in transport tipping on the handling device and correspondingly tipping over and off the handling device.

In order to prevent this, it makes sense to configure the fixations or at least some of the fixations in such a way that the carrier for goods in transport is prevented from tipping over on the handling device. This may be achieved, for example, with a rear grip (form-fitting fixation, for example between the bolt and the prism) so that, for example, the bolt cannot be "pulled out" of the prism.

A further advantageous development of the system according to the invention is that the first fixation and/or the second fixation of the fixation for the carrier for goods in transport are configured as a combination of a bolt and a prism. In addition to the alignment elements, the fixations may advantageously also be configured as a combination of bolts and prism, wherein it is again pointed out that the shapes mentioned may also be replaced or supplemented by other shapes, for example roof edge profile, conical elements etc.

Another advantageous development of the system according to the invention is that the handling device has a first section and a second section which is movable relative to the first section, wherein the second section can be extended or retracted relative to the first section in such a way that a relative distance between the second section and the transport vehicle is increased or decreased by the extension or retraction.

As a result, the positioning (or the positioning movement) of the carrier for goods in transport via the receiving apparatus by the handling device (for example by telescoping the second section of the handling device on which the carrier for goods in transport is movably supported/held) may be carried out when, for example, the transport vehicle has taken its position with respect to the receiving apparatus.

Furthermore, however, the position of the handling device relative to the transport vehicle may also be changed by an extension or retraction movement and the carrier for goods in transport may thus be positioned over the receiving apparatus.

Another advantageous development of the system according to the invention is that the second fixation of the fixation for the carrier for goods in transport is provided on the first section, and the first fixation of the fixation of the carrier for goods in transport is provided on the second section which is movable relative to the first section.

As a result, by extending the second section of the handling device (on which, for example, the carrier for goods in transport is movably supported/held), the carrier for goods in transport can be released from the second fixations (or generally part of the fixations) so that only the fixations on the extendable or retractable second section of the handling device are in contact with the carrier for goods in transport.

In addition, the system according to the invention may advantageously be further developed in that the handling device includes a biasing element, in particular a spring element, which biases the carrier for goods in transport against the first fixation of the fixation for the carrier for goods in transport.

Here, the biasing element may be in contact with the carrier for goods in transport both during the transport of the carrier for goods in transport and during the positioning movement of the carrier for goods in transport relative to the receiving apparatus and may bias it against the first fixation of the fixation for the carrier for goods in transport.

For the latter of the two, it is therefore advantageous if the biasing element is also provided on the second section of the handling device which can be extended or retracted (telescopically) with respect to the first section.

Another advantageous development of the system according to the invention is that the handling device is configured as a transport fork.

However, other embodiments of the handling device may also be used, for example receptacles or grippers which are provided on the transport vehicle and are configured for handling the carrier for goods in transport.

A particularly advantageous development of the system according to the invention is that the transport vehicle is configured as a driverless transport vehicle.

By using driverless transport vehicles that are in contact, for example, with a central computer and/or control unit via radio, WLAN or the like, production processes can be controlled and automated even more effectively. This also includes the optimization of the routes of the transport vehicles, the coordination with the machine tools/manufacturing centers, etc.

The transport device according to the invention for use in a system according to the invention as described above comprises: a transport vehicle that, for positioning the carrier for goods in transport relative to a receiving apparatus which can be set up on a base area or can be arranged on a machine set up on the base area, can be moved freely on the base area, and a handling device provided on the transport vehicle, said handling device being configured to insert and/or exchange the carrier for goods in transport on the receiving apparatus and to hold the carrier for goods in transport during transport, wherein said handling device is configured to hold the carrier for goods in transport in such a way that, when an insertion and/or exchange process is carried out by the handling device, the carrier for goods in transport is kept movable relative to the handling device.

The transport device according to the invention comprising the handling device that movably holds/supports the carrier for goods in transport may advantageously align the carrier for goods in transport with the receiving apparatus when the carrier for goods in transport is positioned over the receiving apparatus (for example by the transport vehicle itself or by the handling device).

The carrier for goods in transport according to the invention for use in a system according to the invention as described above comprises: a section for receiving on a receiving apparatus, wherein the section is further configured to be held movably by a handling device of a transport device during an insertion and/or exchange process, and at least one first alignment element configured to interact with at least one second alignment element provided on the receiving apparatus for aligning the carrier for goods in transport with respect to the receiving apparatus during an insertion and/or exchange process of the carrier for goods in transport on the receiving apparatus.

The carrier for goods in transport according to the invention and the first alignment element that comes into operative contact with the second alignment element of the receiving apparatus when the carrier for goods in transport is positioned over the receiving apparatus allow for the carrier for goods in transport to be aligned with the receiving apparatus before the carrier for goods in transport is actually received by the receiving apparatus (for example on clamping cones when the carrier for goods in transport is lowered by the handling device).

The receiving apparatus according to the invention for use in a system according to the invention as described above, wherein the receiving apparatus is configured to receive a carrier for goods in transport and includes at least one second alignment element, the at least one second alignment element being configured to cooperate with at least one first alignment element of the carrier for goods in transport for aligning the carrier for goods in transport with the receiving apparatus during an insertion and/or exchange process of the carrier for goods in transport on the receiving apparatus.

The receiving apparatus according to the invention and the second alignment element that comes into operative contact with the first alignment element of the carrier for goods in transport when the carrier for goods in transport is positioned over the receiving apparatus allow for the carrier for goods in transport to be aligned with the receiving apparatus before the carrier for goods in transport is actually received by the receiving apparatus.

The system according to the invention, the transport device according to the invention, the carrier for goods in transport according to the invention, and the receiving apparatus according to the invention advantageously allow for a compensating movement of the handling device and additional alignment drives for correcting the relative position of the carrier for goods in transport with respect to the receiving apparatus to be omitted. As a result, the weight of the device received by the transport vehicle (here the handling device) can be lower while a greater payload can be received by the transport device in turn. Furthermore, the proposed solution does not require a position measurement of the carrier for goods in transport (with respect to the receiving apparatus) and the proposed solutions need hardly any maintenance, are inexpensive and can be easily retrofitted.

Further aspects and their advantages as well as advantages and more specific implementation options for the aspects and features described above are described in the following descriptions and explanations relating to the attached figures, which are not to be interpreted as restrictive in any way.

BRIEF DESCRIPTION OF THE FIGURES

FIG. 2b schematically shows an exemplary detailed view of the spatial view with a transport device in which the handling device is still retracted, as shown in FIG. 2a;

FIG. 3b schematically shows an exemplary detailed view of the spatial view with a transport device in which the handling device for positioning the carrier for goods in transport is extended over the receiving apparatus, as shown in FIG. 3a;

FIG. 4b schematically shows an exemplary detailed view of the embodiment shown in FIG. 4a;

FIG. 5b schematically shows an exemplary detailed view of the embodiment shown in FIG. 5a;

FIG. 6b schematically shows exemplary detailed views of the first and second fixations as shown in FIG. 6a;

FIG. 7b schematically shows an exemplary detailed view of the first and second alignment elements in contact with one another and of the active first fixation as shown in FIG. 7a;

FIG. 8b schematically shows an exemplary detailed view of the still active first fixation and the biasing element as shown in FIG. 8a;

FIG. 9b schematically shows an exemplary detailed view of the now inactive first fixation and the alignment elements being in contact as shown in FIG. 9a;

FIG. 10 shows schematically an exemplary flow chart of a method for loading a machine tool with a carrier for goods in transport by means of the transport device according to an exemplary embodiment of the present invention.

DETAILED DESCRIPTION OF THE FIGURES AND PREFERRED EXEMPLARY EMBODIMENTS OF THE PRESENT INVENTION

In the following, examples and exemplary embodiments of the present invention are described in detail with reference to the accompanying figures. Identical or similar elements in the figures may be denoted by the same reference symbols.

It is to be noted that the present invention is in no way limited or restricted to the exemplary embodiments described below and implementation features thereof, but rather further comprises modifications of the exemplary embodiments, in particular those that are included within the scope of protection of the independent claims via modifications of the features of the described examples or via combinations of one or more of the features of the examples described.

Figure 1:
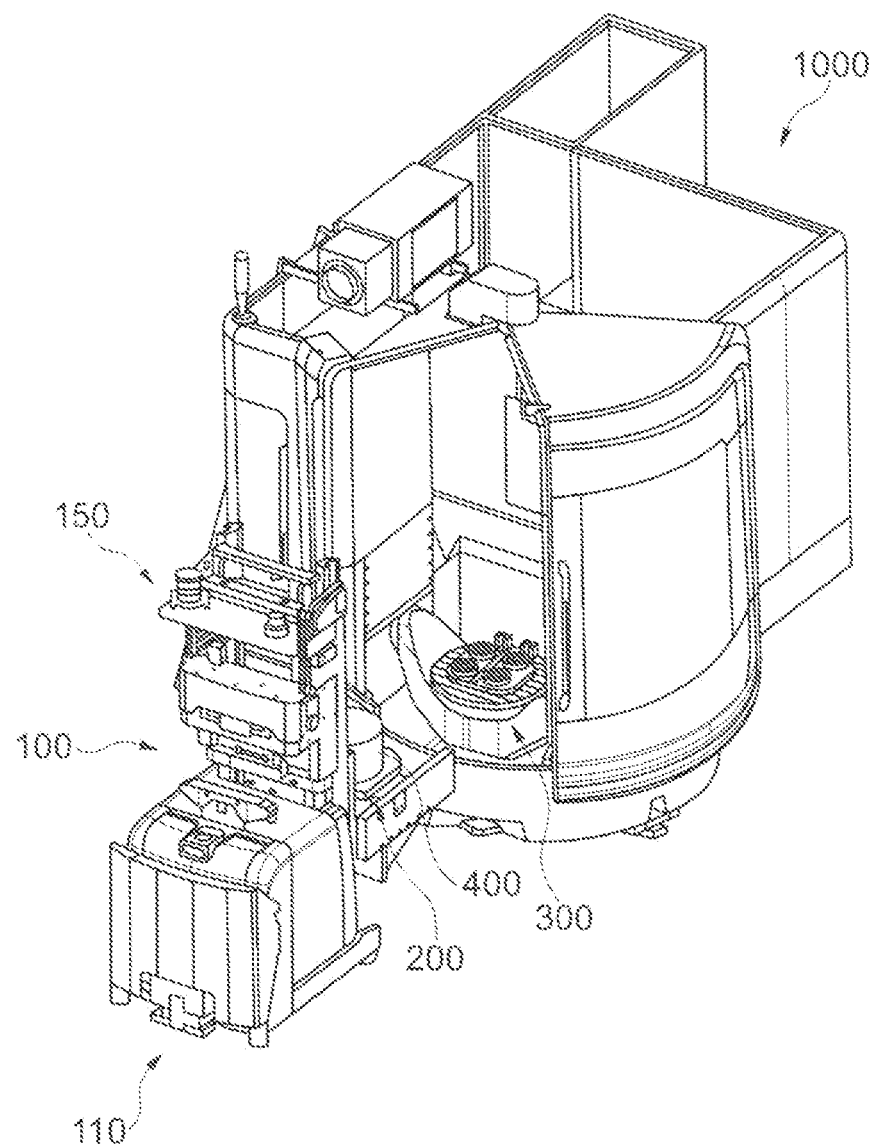
FIG. 1 schematically shows an exemplary embodiment of the system comprising a transport device, a carrier for goods in transport and a receiving apparatus.

FIG. 1 schematically shows an exemplary embodiment of the system comprising a transport device 100, a carrier for goods in transport 200 and a receiving apparatus 300.

Here, the receiving apparatus 300 is provided, for example, on a machine table (here, for example, a rotary/swivel table; may also be a rotary table or a fixed machine table) in a machine tool 1000, for example to further machine the goods in transport 400 that may be a raw part or an already machined part. However, other goods in transport may also be transported to the machine tool 1000, for example a tool store or tools/apparatus required for machining a workpiece, etc.

However, it should already be pointed out here that the receiving apparatus 300 may also be provided at another location, for example at a setup station, in an intermediate storage of any kind, at a storage location, in a high shelf or generally at a shelf location. The examples mentioned are not to be understood as conclusive and may be expanded/supplemented by further possibilities of using a receiving apparatus 300.

Furthermore, the transport device 100 shown comprises a transport vehicle 110 configured, for example, as a driverless transport vehicle which is freely movable (i.e., in particular not rail-bound or the like, for example) on a base area (e.g., a hall floor). However, a driverless transport vehicle does not necessarily have to be used as the transport vehicle 110; any other vehicles that are configured to receive/attach a handling device 150 may also be used as the transport vehicle 110.

The handling device 150 of the transport device 100 shown here has, for example, a height adjustment which can be used, for example, to place the carrier for goods in transport 200 on the receiving apparatus 300. However, the carrier for goods in transport 200 may also be set down in a different manner. For example, the transport vehicle 110 may have a separate height adjustment (for example on the chassis) so that, when the entire transport vehicle 110 is lowered, the carrier for goods in transport 200 is also placed on the receiving apparatus 300.

Moreover, it may advantageously be possible that the transport device 100 is in contact (by radio, WLAN, etc.) with the machine tool 1000 (or another destination intended for the carrier for goods in transport 200), for example, in order to be able to directly exchange information or signals regarding the transported goods in transport 400 with one another. This may also be carried out via a computer or control unit that is in contact with the transport device 100 and the machine tool 1000.

Figure 2A:
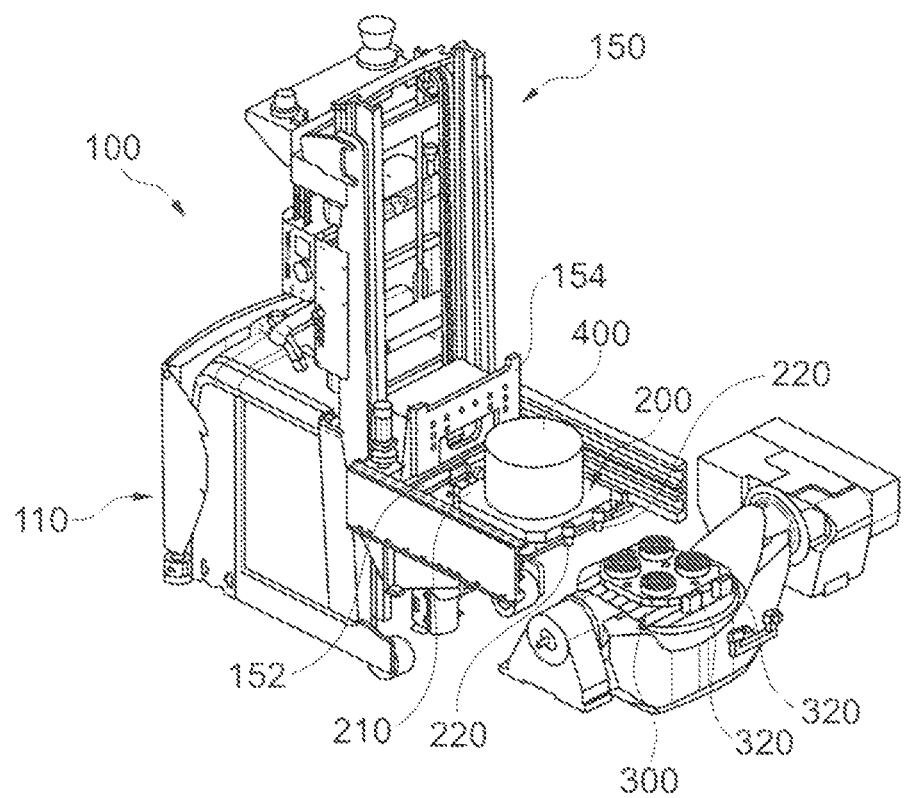
FIG. 2a schematically shows a three-dimensional view of an exemplary embodiment of the system with a transport device in which the handling device is still retracted.

FIG. 2a schematically shows a detailed view of an exemplary embodiment of the system with a transport device 100 in which the handling device 150 is still retracted.

It can be seen here how the transport device 100 with the carrier for goods in transport 200 has already taken up a position on the handling device 150 in order to place the carrier for goods in transport 200 with the goods in transport 400 on the receiving apparatus 300.

The direct positioning of the carrier for goods in transport 200 over the receiving apparatus 300 can be achieved, for example, by means of the handling device 150 having a first section 154 connected to the transport vehicle 110 and a second section 152 which is movable relative to the first section 154 and on which the carrier for goods in transport 200 is held/supported.

It is to be noted here that the first section 154 connected to the transport vehicle 110 can be moved at least in the vertical direction, for example to allow for the movable second section 152 of the handling device 150 to be lowered or, for example, to place the carrier for goods in transport 200 on the receiving apparatus 300. Compared to the first section 154 of the handling device 150, the movable second section 152 therefore has at least one additional travel option with respect to the transport vehicle 110.

Here, the movable second section 152 may be extended or retracted (telescoped) with respect to the first section 154 connected to the transport vehicle 110 by means of guides and a drive. All common and known guides/bearings (such as sliding bearings, ball or roller bearings in the corresponding guides) and drives (such as linear drives, etc.) may be used for this purpose.

The carrier for goods in transport 200 substantially comprises a section 210 which may be configured to be received on the receiving apparatus 300 and also has an option of fastening the transport goods 400 on the section 210 of the carrier for goods in transport 200.

Figure 3A:
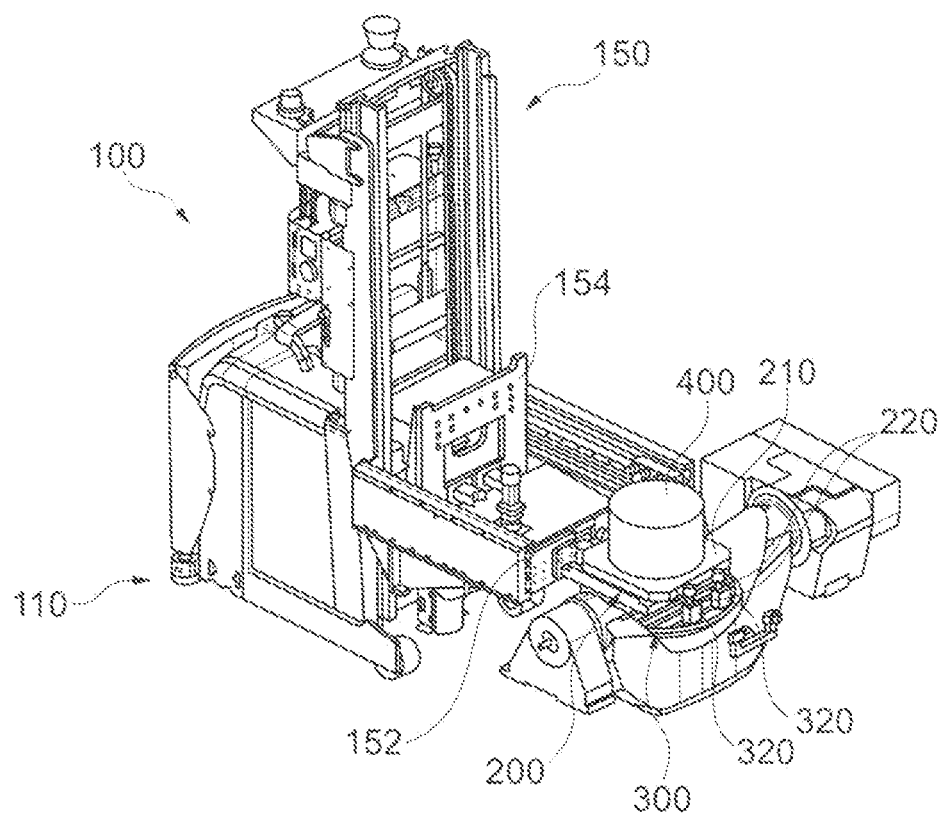
FIG. 3a schematically shows a spatial view of an exemplary embodiment of the system with a transport device in which the handling device for positioning the carrier for goods in transport is extended over the receiving apparatus.
Figure 3B:
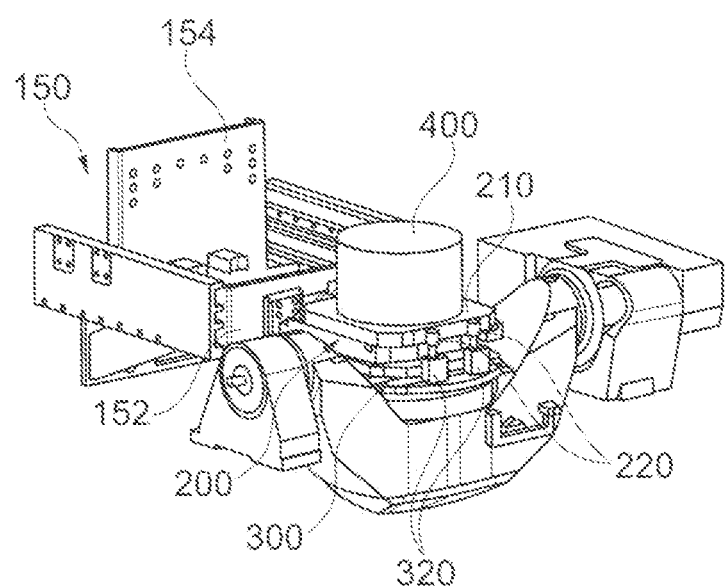

In addition, the carrier for goods in transport 200 comprises at least one first alignment element 220 that, in cooperation with at least one second alignment element 320 of the receiving apparatus 300, aligns the carrier for goods in transport 200 with the receiving apparatus 300 (see also FIGS. 3a and 3b). For this purpose, bolts may be used for the first alignment elements 220 and prisms may be used for the second alignment elements 320, for example. It should be noted, however, that other shapes and shape pairings are also conceivable, for example roof edge shapes and cone shapes.

As already described above, the carrier for goods in transport 200 may be positioned over the receiving apparatus 300, either by the movement of the transport vehicle 110 itself or by extending or retracting the second section 152 of the handling device 150 relative to the first section 154 of the handling device 150.

Due to the positioning, in particular during the positioning movement of the carrier for goods in transport 200 relative to the receiving apparatus 300, the carrier for goods in transport 200 can, after contact has been made between the first alignment element 220 and the second alignment element 320, be oriented via the interaction of the first and second alignment elements 220, 320 and thus be aligned with the receiving apparatus 300.

It is to be understood that, before the carrier for goods in transport 200 is positioned, the position of the carrier for goods in transport 200 relative to the receiving apparatus 300 should substantially be provided to the extent that the first and the second alignment elements 220, 320 can come into contact with one another to cause the alignment of the carrier for goods in transport 200.

Figure 2B:
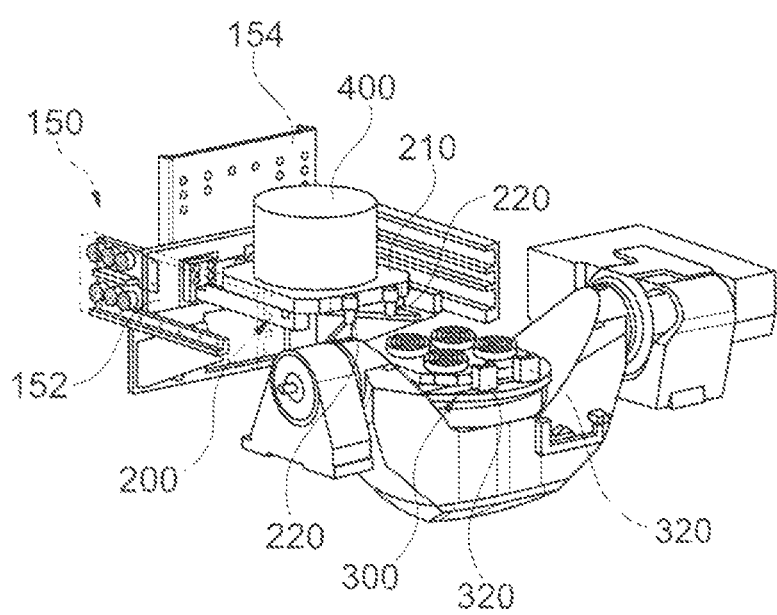

FIG. 2b schematically shows an exemplary detailed view of the spatial view with a transport device 100 in which the handling device 150 is still retracted, as shown in FIG. 2a.

Moreover, FIG. 2b shows that the handling device 150, in particular the movable (telescopic) second section 152, is, for example, a transport fork. However, it should be pointed out here that the handling device 150 may also have any other shape and configuration, for example that of a receptacle or a gripper configured for handling the carrier for goods in transport 200.

FIG. 3a schematically shows a spatial view of an exemplary embodiment of the system with a transport device 100 in which the handling device 150 for positioning the carrier for goods in transport 200 is extended over the receiving apparatus 300.

In particular, it can be seen how the movable (telescopic) second section 152 of the handling device 150 has been extended with respect to the first section 154 towards the receiving apparatus 300 in order to position the carrier for goods in transport 200 over the receiving apparatus 300.

Furthermore, it can now be seen how the first alignment elements 220 of the carrier for goods in transport 200 are in contact with the second alignment elements 320 of the receiving apparatus 300 and can thus bring about an alignment of the carrier for goods in transport 200.

By means of the alignment elements 220, 320, which are present in pairs here, the carrier for goods in transport 200 can advantageously align not only in the direction of the positioning movement with respect to the receiving apparatus 300 (by limiting the positioning movement by means of the alignment elements 220/320), but also at an angle to the receiving apparatus 300 in such a way that the carrier for goods in transport 200 is rotated until the paired first alignment elements 220 are oriented in parallel to the paired second alignment elements 320 or until both first alignment elements 220 have come into contact with both second alignment elements 320.

FIG. 3b schematically shows an exemplary detailed view of the spatial view with a transport device 100 in which the handling device 150 for positioning the carrier for goods in transport 200 is extended over the receiving apparatus 300 as shown in FIG. 3a.

Figure 4A:
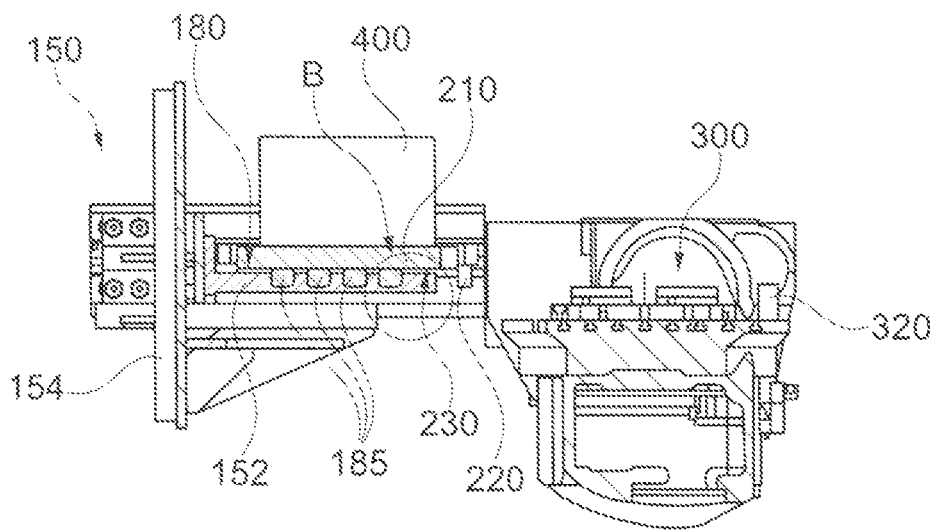
FIG. 4a schematically shows an exemplary side view of an embodiment of a system with a first fixation and a bearing mechanism on the handling device.

FIG. 4a schematically shows an exemplary side view of an exemplary embodiment of a system with a first fixation 230 and a bearing mechanism 185 on the handling device 150.

Here, the first fixation 230 of the fixation for the carrier for goods in transport is provided, for example, on the side of the carrier for goods in transport 200 (or the section 210 thereof) facing away from the transport vehicle 110 and is advantageously used to prevent the carrier for goods in transport 200 from sliding off the handling device 150 (a transport fork in the example shown) and thus to guarantee safe transport.

For this purpose, it is suitable when the first fixation 230 is configured in the form of a mechanical stop, for example by means of a bolt 231 and a prism 131 (see FIG. 4b) against which the bolt 231 of the first fixation 230 can be pressed or which generally prevents the movement of the bolt 231 of the first fixation 230.

However, other shapes and shape pairings may also be used for the configuration of the first fixation 230, for example a roof edge shape or a cone shape.

In addition, a bearing mechanism 185 on which the carrier for goods in transport 200 is movably mounted may be provided on the handling device 150 so that significantly lower frictional forces and wear occur between the handling device 150 and the carrier for goods in transport 200 when the carrier for goods in transport 200 is aligned with the receiving apparatus 300.

Moreover, the lower frictional forces may improve the alignment of the carrier for goods in transport 200 since significantly lower forces have to be applied in order to move/position the carrier for goods in transport 200 on the handling device 150.

The storage mechanism 185 may be configured, for example, by ball rollers and/or rollers. However, sliding bearing elements may also provide a lower coefficient of friction between the carrier for goods in transport 200 and the handling device 150 so that this configuration is also a possibility. As a further possibility, there are of course also bearings implemented with a medium (such as compressed air) such as aerostatic bearings and the like.

Furthermore, the handling device 150 may also have a support section 180 on which the carrier for goods in transport 200 rests directly on the handling device 150 (for example directly on the transport fork) or by which the carrier for goods in transport 200 is held.

Figure 4B:
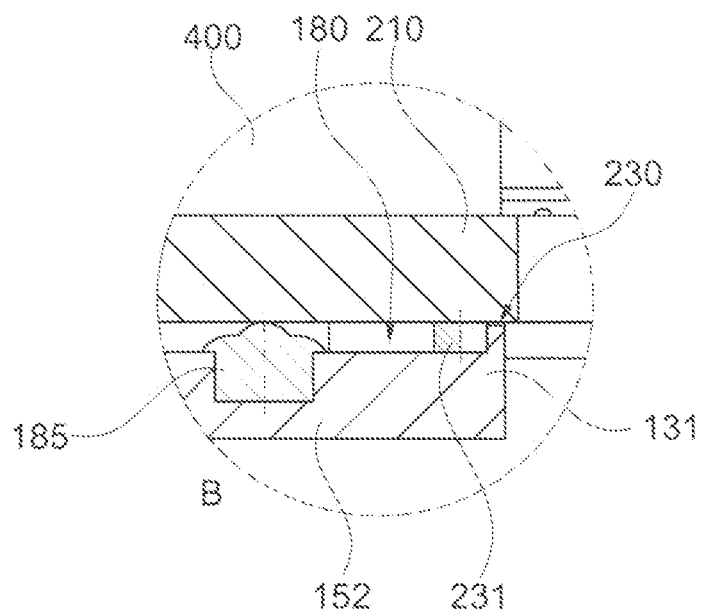

FIG. 4b schematically shows an exemplary detailed view of the exemplary embodiment shown in FIG. 4a with the support section 180, the bearing mechanism 185 and the first fixation 230.

Figure 5A:
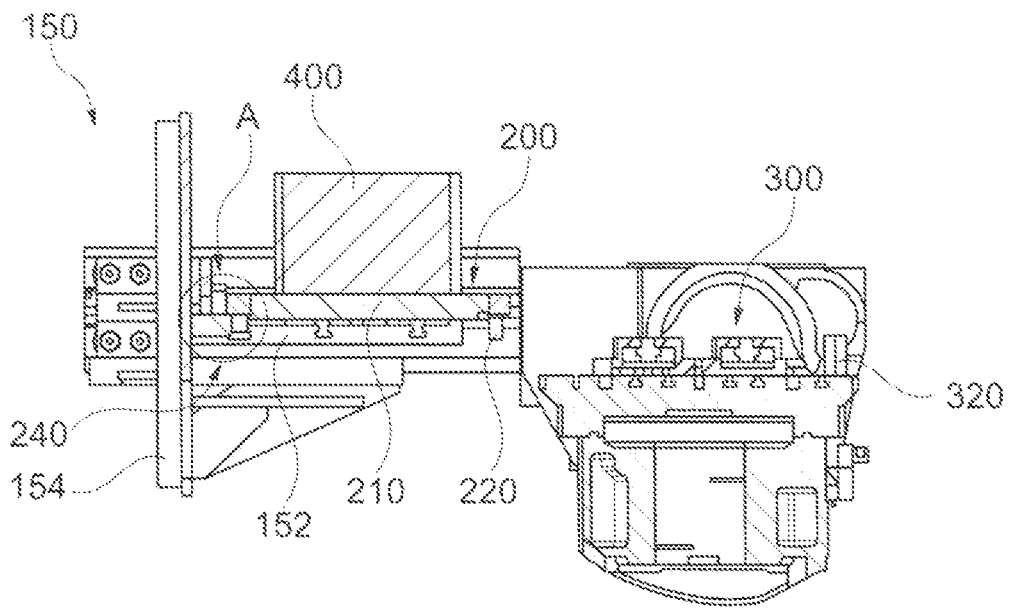
FIG. 5a schematically shows an exemplary side view of an exemplary embodiment of a system with a second fixation against tilting of the carrier for goods in transport.

FIG. 5a schematically shows an exemplary side view of an exemplary embodiment of a system with a second fixation 240 to prevent the carrier for goods in transport 200 from being tipped over and off the handling device 150.

Here, the second fixation 240 is provided, for example, on the side of the carrier for goods in transport 200 facing the transport vehicle 110 and is advantageously used, in addition to additionally securing the carrier for goods in transport 200 against slipping on the handling device 150, to prevent the carrier for goods in transport 200 from being tipped over and off the handling device 150 (for example, the transport fork).

This may be particularly important if the goods in transport 400 generate, due to the structure/shape thereof, a moment of tilt on the carrier for goods in transport 200 and/or such a moment of tilt would be caused by comparatively strong acceleration forces.

Figure 5B:
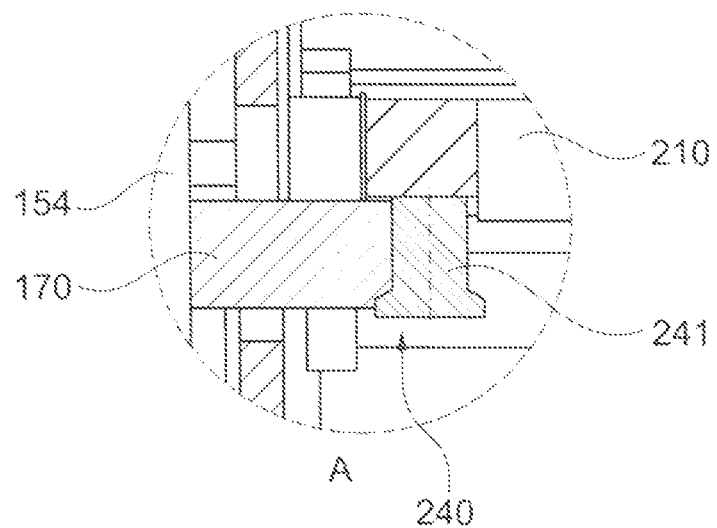

For this purpose, the second fixation 240 includes, for example, a rear grip (projection of the bolt 241 at the lower end, which is in engagement with the prism 170; see in particular FIG. 5b), due to which the bolt 241 cannot be moved in the length direction thereof with respect to the prism 170 (here for example provided on the first section 154 of the handling device 150) as long as the rear grip is in engagement with the prism 170.

Here, however, other shapes and combinations of shapes may also be provided in order to configure the second fixation 240 and in particular also the rear grip. The above-mentioned examples of a roof edge shape or a cone shape may be used as well as any other known shapes.

Securing against tilting of the carrier for goods in transport 200 with respect to the handling device 150 is not necessary just implemented by the second fixation 240 either. The tilt protection may also be implemented, for example, by separate elements or mechanisms, for example by a separate locking mechanism, etc.

In any case, the provision of the second fixation 240 of the carrier for goods in transport fixation can ensure a safe transport of the carrier for goods in transport 200 by the handling device 150.

FIG. 5b schematically shows an exemplary detailed view of the exemplary embodiment shown in FIG. 5a with the second fixation 240 comprising the bolt 241 (with a projection as a rear grip) and the prism 170 provided on the first section 154 of the handling device 150.

Figure 6A:
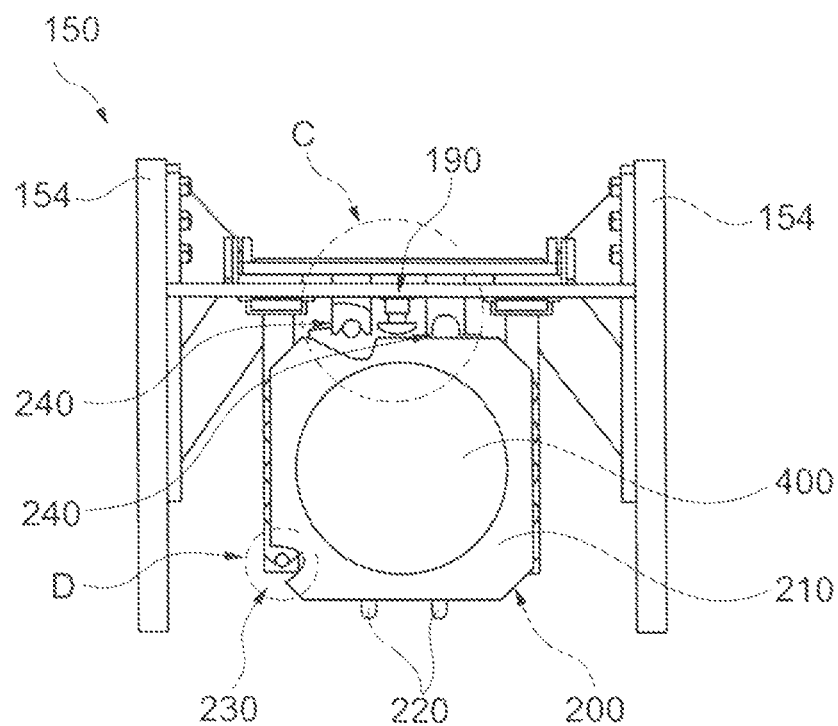
FIG. 6a schematically shows an exemplary top view of an embodiment of the handling device with a carrier for goods in transport and the respective first and second fixations.

FIG. 6a schematically shows an exemplary top view of an exemplary embodiment of the handling device 150 with a carrier for goods in transport 200 and the respective first and second fixations 230, 240.

The second section 52 of the handling device 150, which is movable relative to the first section 154, can still be seen in the retracted state so that both fixations 230/240 are in engagement (active).

In addition, an exemplary biasing element 190 is shown here which is provided on the movable second section 152 of the handling device 150 and can continuously bias/press the carrier for goods in transport 200 against the first fixation 230 during transport. In this way, the contact between the bolt 231 and the prism 131 of the first fixation 230 can always be guaranteed.

Due to the retracted state of the second section 152 of the handling device 150, the second fixation 240 with the rear grip is also active so that the position of the carrier for goods in transport 200 relative to the handling device 150 and thus the transport of the carrier for goods in transport 200 is optimally secured.

Figure 6B:
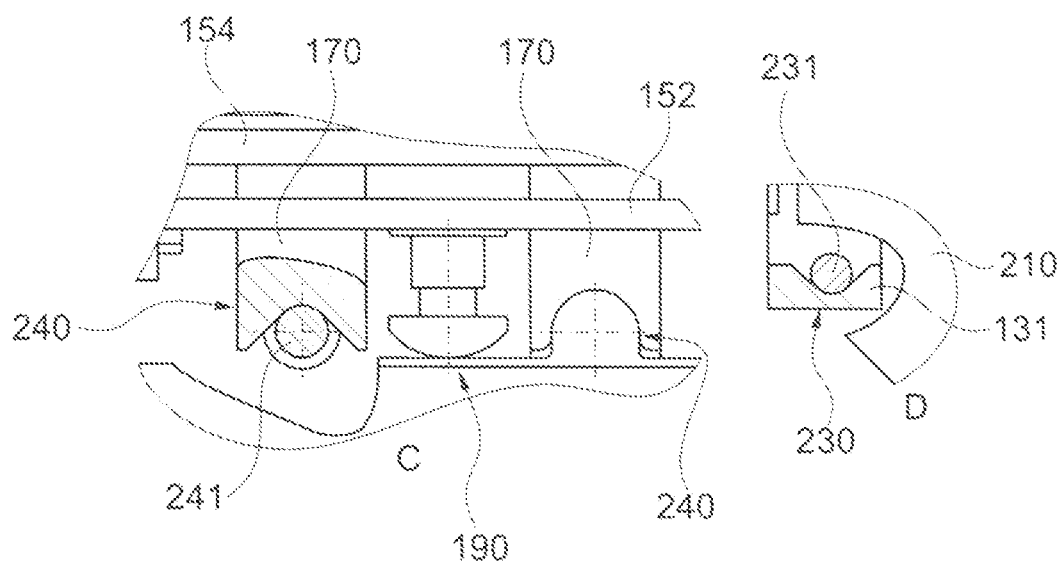

FIG. 6b schematically shows exemplary detailed views of the first and second fixations 230, 240, in particular the respective bolts 231, 241 in contact with the respective prisms 131, 170, as shown in FIG. 6a.

Figure 7A:
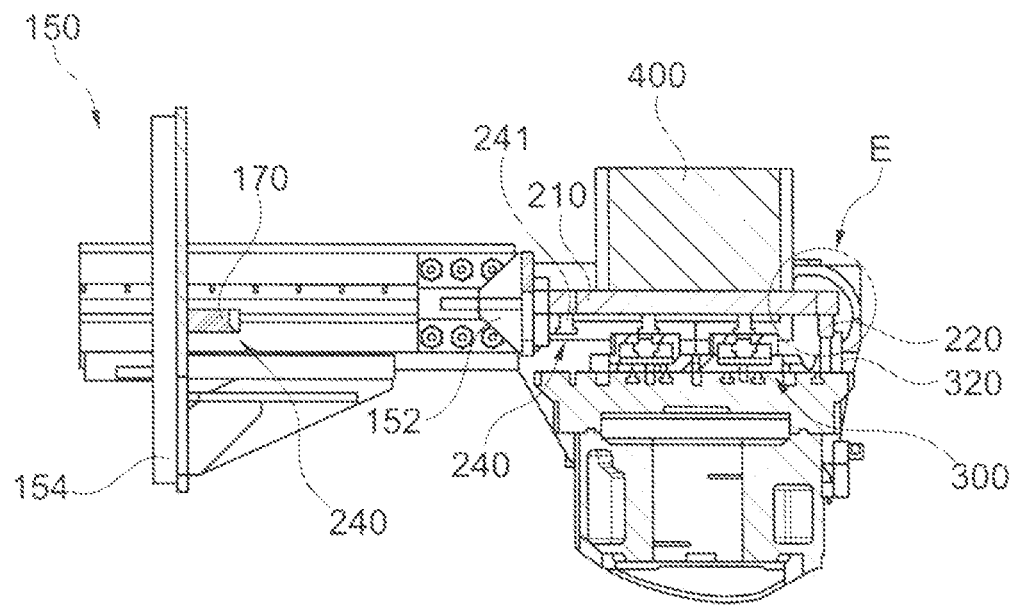
FIG. 7a schematically shows an exemplary side view of an exemplary embodiment of a system with an extended handling device and a carrier for goods in transport positioned over the receiving apparatus.

FIG. 7a schematically shows an exemplary side view of an exemplary embodiment of a system with an extended handling device 150 and a carrier for goods in transport 200 positioned over the receiving apparatus 300.

It can now be seen how the bolt 241 of the second fixation 240 is separated from the prism 170 of the second fixation 240 so that the second fixation 240 of the carrier for goods in transport 200 is no longer active with respect to the handling device 150.

The two elements (bolt 241/prism 170) are separated during the extension movement of the movable second section 152 with respect to the first section 154 of the handling device 150. However, since lower accelerations can be expected during the extension movement (and also during the retracting movement) than possibly may be expected during the movement of the transport vehicle 110, the second fixation 240 of the carrier for goods in transport fixation may be released at that moment and the carrier for goods in transport 200 may be positioned over the receiving apparatus 300 and the first and second alignment elements 220, 320 may be brought into contact.

The now significantly increased risk of tipping over for the carrier for goods in transport 200 or for the goods in transport 400 is further prevented in that the biasing element 190 (see also FIGS. 8a/8b) biases the carrier for goods in transport 200 against the first fixation 230 and a tilting moment that occurs could still be absorbed to a limited extent by the frictional forces occurring between biasing element 190/carrier for goods in transport 200/first fixation 230.

Figure 7B:
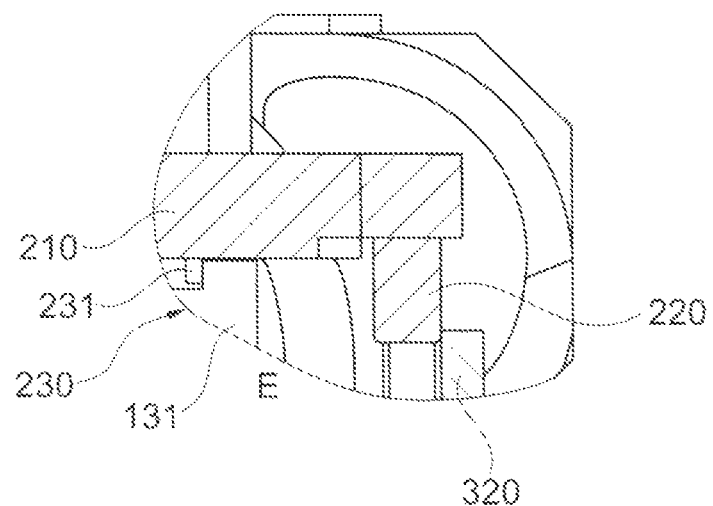

FIG. 7b schematically shows an exemplary detailed view of the first and second alignment elements 220, 320 in contact with one another and of the active first fixation 230, as shown in FIG. 7a.

Figure 8A:
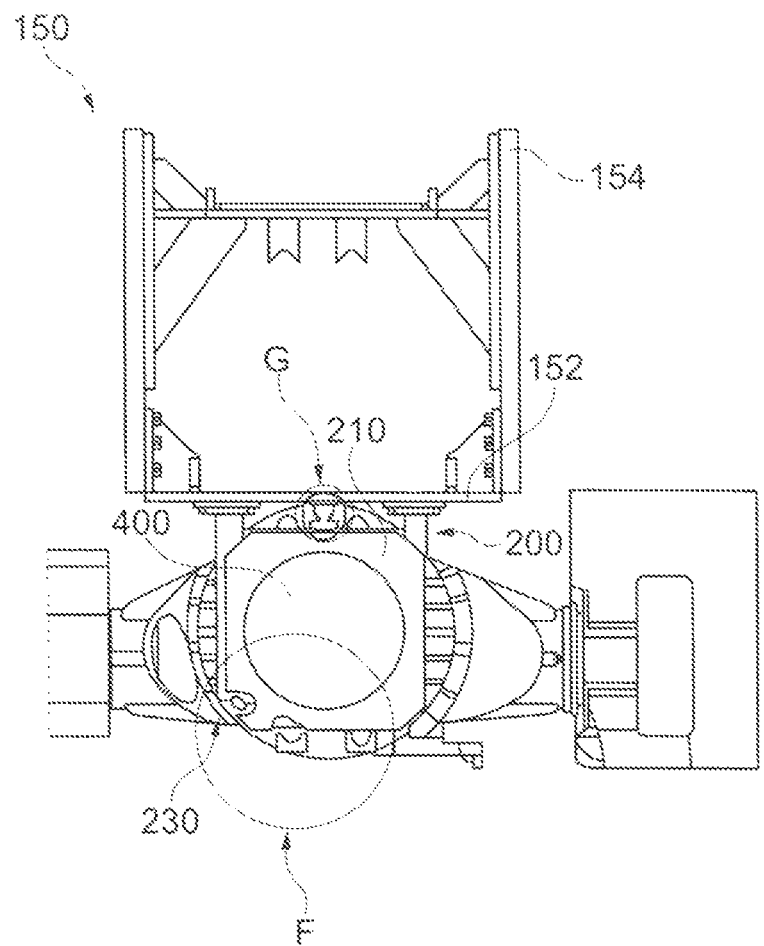
FIG. 8a schematically shows an exemplary top view of an exemplary embodiment of a system with an extended handling device as well as of a still active first fixation and a biasing element.

FIG. 8a schematically shows an exemplary top view of an exemplary embodiment of a system with an extended handling device 150 as well as a still active first fixation 230 and a biasing element 190.

Figure 8B:
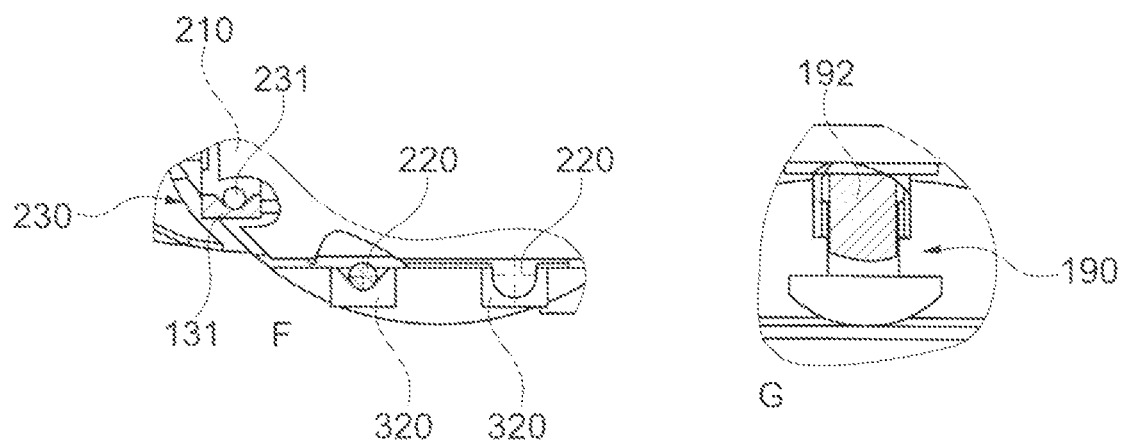

As already described in FIG. 7a, the biasing element 190, which, as shown in FIG. 8b, is advantageously a spring element 192 (or, for example, a gas cylinder etc.), remains in contact with the carrier for goods in transport 200 when the movable second section 152 is extended relative to the first section 154 of the handling device 150.

This results in the first fixation 230 still being active, that is, the bolt 231 still being in contact with the prism 131, but the second fixation 240 being inactive since the contact between the bolt 241 and prism 170 has been released due to the extension movement of the second section 152 of the handling device 150.

Furthermore, FIG. 8a shows that the alignment elements 220, 320 have already come into contact with one another and therefore an alignment of the carrier for goods in transport 200 with the receiving apparatus 300 has already taken place via the positioning movement of the carrier for goods in transport 200 over the receiving apparatus 300.

FIG. 8b schematically shows an exemplary detailed view of the still active first fixation 230 and the biasing element 190 as well as the alignment elements 220 320 that are already in contact, as shown in FIG. 8a.

Figure 9A:
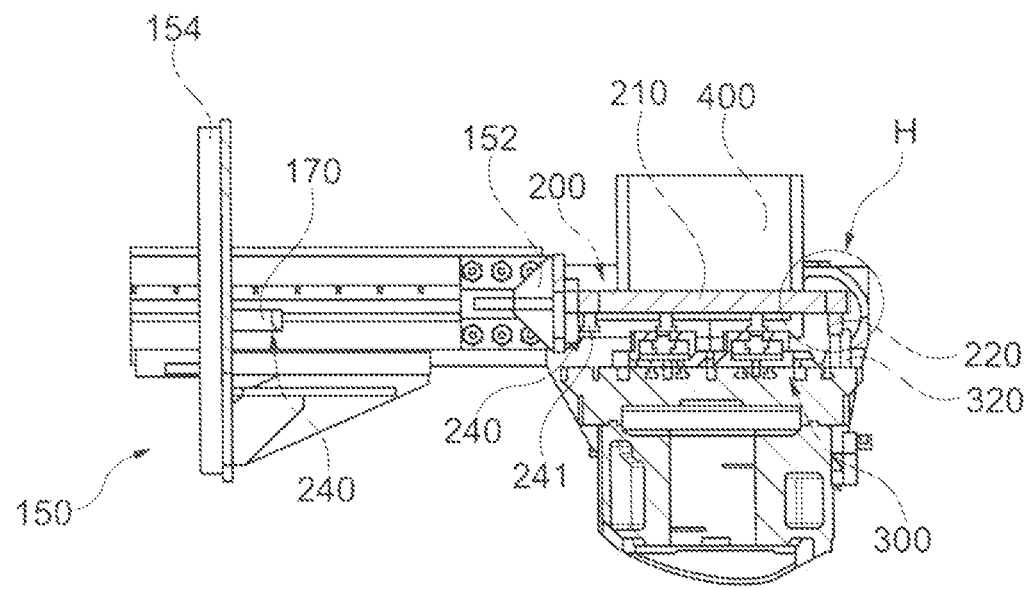
FIG. 9a schematically shows an exemplary side view of an exemplary embodiment of a system with an extended handling device and a now inactive first fixation and a biasing element.

FIG. 9a schematically shows an exemplary side view of an exemplary embodiment of a system with an extended handling device 150 and a now inactive first fixation 230 and a biasing element 190.

Here (see also FIG. 9b), it can now be seen in particular that the first and second alignment elements 220, 320 are in contact with one another while the contact between the bolts 231 and the prisms 131 of the first fixation 230 of the fixation for the carrier for goods in transport has been released and, as a result, the first fixation 230 is no longer active. Only the biasing element remains in contact with the carrier for goods in transport 200 (see also FIGS. 8a/8b in this regard).

The further extension of the movable second section 152 with respect to the first section 154 of the handling device 150 with the alignment elements 220, 320 already being fully in contact causes the carrier for goods in transport 200 (in the aligned state, which is also retained by the contact of the first and second alignment elements 220, 320) to be displaced relative to the handling device 150 towards the biasing element 190 so that the first fixation 230 between the carrier for goods in transport 200 and the handling device 150 is released.

This may be recommended, and in some cases even necessary, for the carrier for goods in transport 200 to be set down on the receiving apparatus 300 (for example, the clamping cones) and to bring about a "separation" of the carrier for goods in transport 200 and the handling device 150.

Once this has taken place, the handling device 150 may be moved back under the carrier for goods in transport 200 that is set down (by a displacement movement of the transport vehicle 110 or a retraction movement of the movable second section 152 with respect to the first section 154 of the handling device 150) and may, for example, receive a new carrier for goods in transport 200 at another location (setup station, machine tool, storage space, etc.).

Figure 9B:
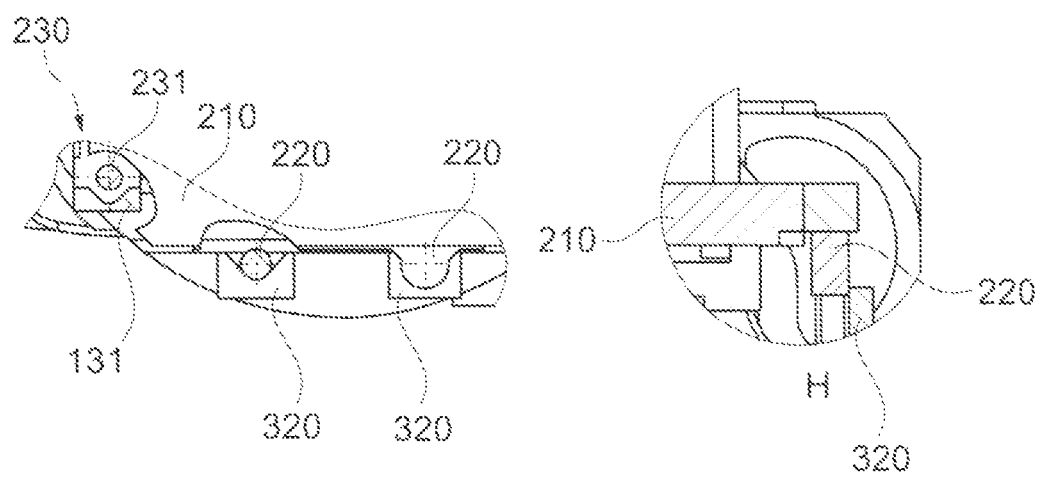

FIG. 9b schematically shows an exemplary detailed view of the now inactive first fixation 230 and the alignment elements 220, 320 that are in contact, as shown in FIG. 9a.

FIG. 10 schematically shows an exemplary flow chart of a method for loading a machine tool 1000 with a carrier for goods in transport 200 by means of the transport device 100 according to an exemplary embodiment of the present invention.

At the beginning (step S101), the transport device 100 with the carrier for goods in transport 200 received the handling device 150 moves in front of the machine tool 1000 with the second section 152 of the handling device 150 retracted.

Then, a signal exchange (e.g., contactless) between the machine tool 1000 and the transport device 100 can take place (step S102).

In this way, the signal to open the machine access can be given to the machine tool 1000 so that the transport device 100 can position itself in front of the machine tool 1000 (step S103) and the carrier for goods in transport 200 can be introduced into the machine tool 1000 by the transport device 100.

Now the second section 152 of the handling device 150 with the held carrier for goods in transport 200 can be extended (step S104) until the second section 152 or the carrier for goods in transport 200 has reached an intermediate position over the receiving apparatus 300 in the machine tool 1000 (step S105). Here, the goods in transport 400 or the carrier for goods in transport 200 remain in their position relative to the handling device 150 due to the interaction of the biasing element 190 with the first fixation 230.

The second section 152 of the handling device 150 can now be extended further (step S106) until the first alignment elements 220 of the carrier for goods in transport 200 come into contact with the second alignment elements 320 of the receiving apparatus 300.

As a result, the goods in transport 400 or the carrier for goods in transport 200 are aligned with the receiving apparatus 300 in the horizontal plane (longitudinal and transverse direction). During this, the carrier for goods in transport 200 "shifts" relative to the handling device 150 (in particular with respect to the second section 152 of the handling device 150). In order to keep the friction and wear as low as possible, the bearing mechanism 185 with, for example, ball rollers, rollers and/or sliding bearing elements may additionally be provided on the second section 152 of the handling device 150.

At this point in time, the first fixation 230 (or at least a part of it) is still active, that is to say the bolts 231 are still in contact with the prisms 131. The biasing element 190 presses the carrier for goods in transport 200 against the first fixation 230.

Then, the second section 152 of the handling device 150 extends further (step S107). During this, the carrier for goods in transport 200 is still pressed against the first fixation 230 by the biasing element 190 and is thereby held in position relative to the handling device 150. As already described, the first alignment elements 220 of the carrier for goods in transport 200 are still in contact with the second alignment elements 320 of the receiving apparatus 300.

The second section 152 of the handling device 150 can now fully extend, wherein the carrier for goods in transport 200 on the handling device 150 is shifted by the alignment elements 220, 320 that are already in contact in such a way that the first fixation 230 is thereby released.

The carrier for goods in transport 200 may then be deposited in the machine tool 1000 (step S108), for example by a vertical lift of the handling device 150 or the transport vehicle 110. The receptacles of the receiving apparatus 300 or the carrier for goods in transport 200 (e.g., clamping cones) are used.

The second section 152 of the handling device 150 is then lowered a little further (step S109) in order to be free of contact under the carrier for goods in transport 200.

The second section 152 of the handling device 150 may now be retracted (step S110) and/or the transport device 100 moves away from the machine tool 1000 (step S111).

The machine access of the machine tool 1000 may now be closed again (step S112) and the machining of the goods in transport 400 inserted by means of the carrier for goods in transport 200 may be continued (step S113).

It should be pointed out here that, in order to remove the carrier for goods in transport 200 from the machine tool 1000, the steps mentioned may essentially be carried out in reverse order.

It should also be pointed out that the method described was carried out on the machine tool 1000 mentioned merely as an example. The method may also be carried out on setup stations, storage locations, etc., i.e., wherever a receiving apparatus 300 for receiving the transport goods carrier 200 is set up.

Examples and exemplary embodiments of the present invention and their advantages have been described in detail above with reference to the accompanying figures.

It should be emphasized again that the present invention, however, is in no way limited or restricted to the exemplary embodiments described above and implementation features thereof, but rather further comprises modifications of the exemplary embodiments, in particular those that are included within the scope of protection of the independent claims via modifications of the features of the described examples or via combinations of one or more of the features of the examples described.

LIST OF REFERENCE SYMBOLS 100 transport device
110 transport vehicle
131 prism of the first fixation
150 handling device
152 movable second section of the handling device
154 first section of the handling device
170 prism of the second fixation
180 support section of the handling device
185 bearing mechanism
190 biasing element
192 spring element
200 carrier for goods in transport
210 section of the carrier for goods in transport
220 first alignment element
230 first fixation
240 second fixation
300 receiving apparatus
320 second alignment element
400 goods in transport
1000 machine tool

The invention claimed is:

1. A system, comprising:
a transport device including a transport vehicle which can be moved freely on a base area and a floating support handling device provided on said transport vehicle,
a carrier for goods in transport configured to be received by said floating support handling device and that includes at least one first alignment element, and
a receiving apparatus configured to receive said carrier for goods in transport and to be set up on the base area or arranged on a machine set up on the base area, wherein
said floating support handling device is configured to hold said carrier for goods in transport in such a way that, when said carrier for goods in transport is inserted and/or exchanged on said receiving apparatus by said floating support handling device, said carrier for goods in transport is kept movable relative to said floating support handling device within a horizontal plane in a longitudinal and transverse direction, and
said receiving apparatus includes at least one second alignment element which, when said carrier for goods in transport is inserted and/or exchanged, is configured to interact with the at least one first alignment element of said carrier for goods in transport before said carrier for goods in transport is received by said receiving apparatus and in such a manner that interaction of the first and second alignment elements aligns said carrier for goods in transport with said receiving apparatus by moving said carrier for goods in transport relative to said floating support handling device within said horizonal plane before said carrier for goods is placed on said receiving apparatus.

2. The system according to claim 1, characterized in that the first alignment element of said carrier for goods in transport is provided on the side of said carrier for goods in transport facing away from said transport vehicle or on the side of said carrier for goods in transport facing said transport vehicle.

3. The system according to claim 1, characterized in that the at least one first alignment element of said carrier for goods in transport and correspondingly the at least one second alignment element of said receiving apparatus are configured as a combination of one or more bolts and one or more prisms, wherein said carrier for goods in transport includes the bolts or the prisms and said receiving apparatus correspondingly includes the prisms or the bolts.

4. The system according to claim 1, characterized in that said floating support handling device includes a support section by which said carrier for goods in transport is held.

5. The system according to claim 1, characterized in that said floating support handling device includes a bearing mechanism configured such that said carrier for goods in transport is held by said bearing mechanism and is kept movable relative to said floating support handling device.

6. The system according to claim 5, characterized in that said bearing mechanism includes slide bearing elements and/or rollers and/or ball rollers.

7. The system according to claim 1, characterized in that said floating support handling device has at least one fixation for the carrier for goods in transport configured such that said carrier for goods in transport is prevented from falling off said floating support handling device during transport by said transport device.

8. The system according to claim 7, characterized in that said fixation for the carrier for goods in transport of said floating support handling device includes a first fixation facing away from said transport vehicle and a second fixation facing said transport vehicle.

9. The system according to claim 8, characterized in that said first fixation and/or said second fixation of said fixation for the carrier for goods in transport are configured as a stop so that there is no relative movement of said carrier for goods in transport with respect to said floating support handling device during the transport of said carrier for goods in transport.

10. The system according to claim 8, characterized in that said second fixation includes a rear grip so that said carrier for goods in transport is prevented from being tipped over and off said floating support handling device during the transport of said carrier for goods in transport.

11. The system according to claim 8, characterized in that said first fixation and/or said second fixation of said fixation for the carrier for goods in transport are configured as a combination of a bolt and a prism.

12. The system according to claim 8, characterized in that:
said floating support handling device has a first section and a second section which is movable relative to said first section,
wherein said second section can be extended or retracted relative to said first section in such a way that a relative distance between said second section and said transport vehicle is increased or decreased by the extension or retraction.

13. The system according to claim 12, characterized in that said second fixation of said fixation for the carrier for goods in transport is provided on said first section, and said first fixation of said fixation of the carrier for goods in transport is provided on said second section which is movable relative to said first section.

14. The system according to claim 8, characterized in that said floating support handling device includes a biasing element which biases said carrier for goods in transport against said first fixation of said fixation for the carrier for goods in transport.

15. The system according to claim 1, characterized in that said floating support handling device is configured as a transport fork.

16. The system according to claim 1, characterized in that said transport vehicle is configured as a driverless transport vehicle.

\* \* \* \* \*